No. 870,648.
PATENTED NOV. 12, 1907.
J. A. SHUTZ & M. L. KIRKMAN.
VEHICLE HEATER.
APPLICATION FILED OCT. 18, 1906.
2 SHEETS—SHEET 1.
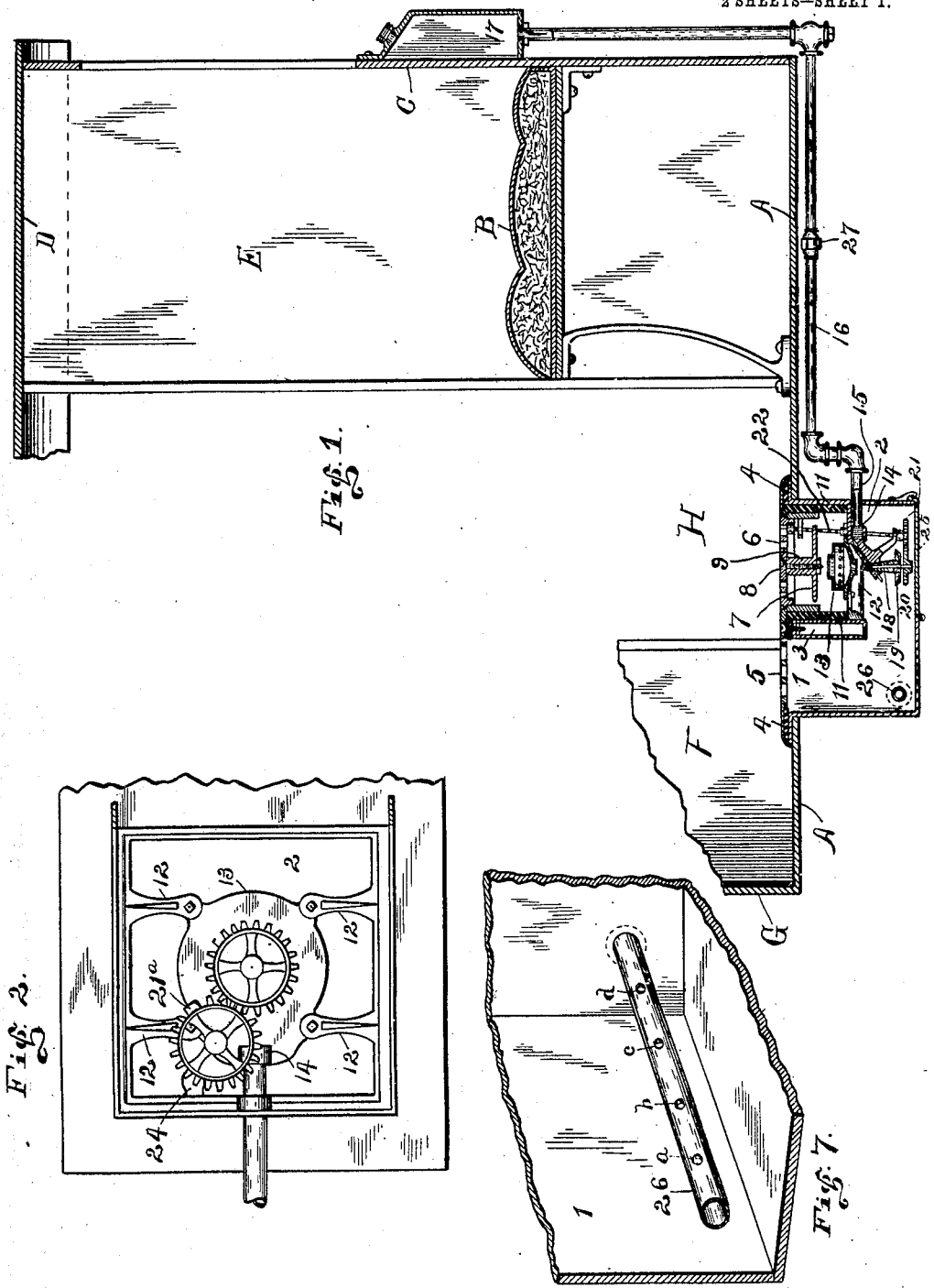
Witnesses:
Adelaide Kearns
R. E. Randle
Inventors
J. A. Shutz and
M. L. Kirkman;
By Robert W. Randle,
Attorney.
THE NORRIS PETERS CO., WASHINGTON, D. C.

No. 870,648. PATENTED NOV. 12, 1907.
J. A. SHUTZ & M. L. KIRKMAN.
VEHICLE HEATER.
APPLICATION FILED OCT. 18, 1906.
2 SHEETS—SHEET 2.
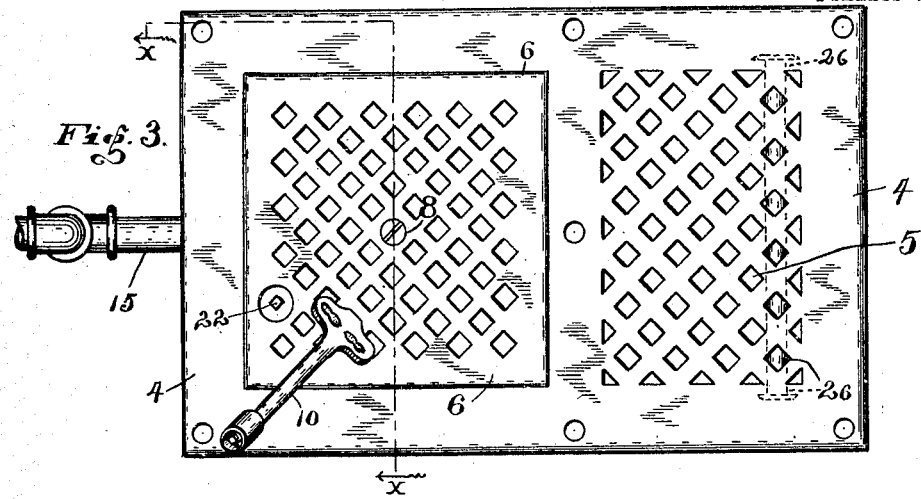
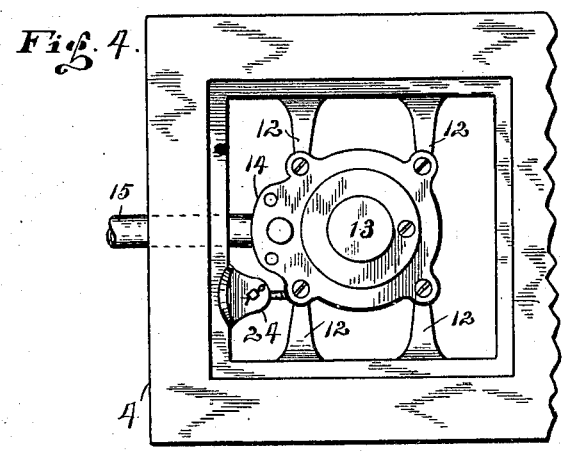
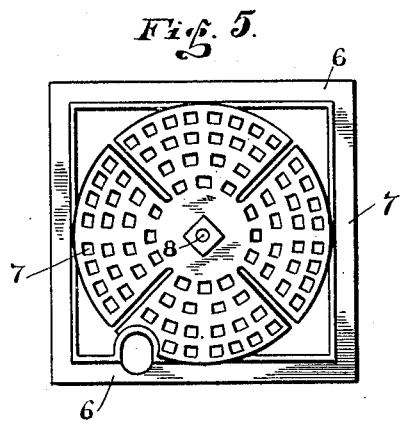
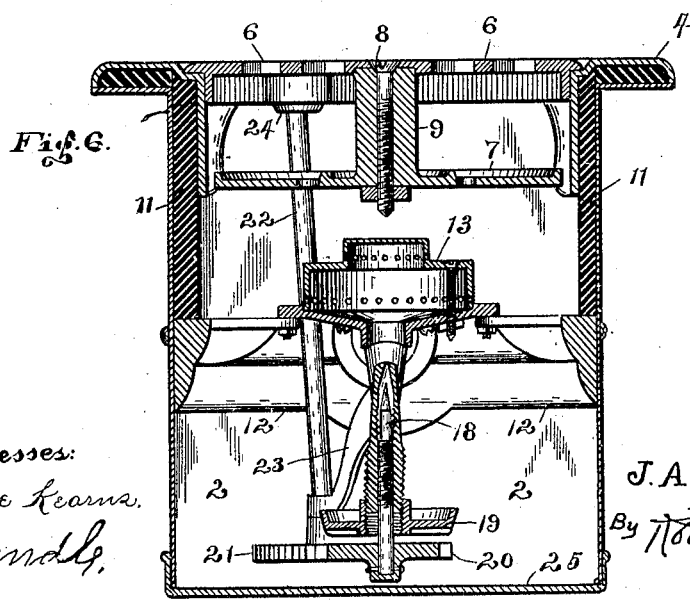
Witnesses:
Adelaide Kearns.
R. E. Randle.
Inventors;
J. A. Shutz and
M. L. Kirkman;
By Robert W. Randle,
Attorney.

UNITED STATES PATENT OFFICE.

JOHN A. SHUTZ AND MADISON L. KIRKMAN, OF RICHMOND, INDIANA, ASSIGNORS, BY DIRECT AND MESNE ASSIGNMENTS, OF ONE-HALF TO THE STANDARD PATTERN & MFG. CO., OF RICHMOND, INDIANA, AND ONE-FOURTH TO HENRY A. WEHRLY, AND ONE-FOURTH TO LEWIS C. ASHMAN, OF NEW PARIS, OHIO.

VEHICLE-HEATER.

No. 870,648.  Specification of Letters Patent.  Patented Nov. 12, 1907.

Application filed October 18, 1906. Serial No. 339,430.

*To all whom it may concern:*

Be it known that we, JOHN A. SHUTZ and MADISON L. KIRKMAN, citizens of the United States, residing in Richmond, in the county of Wayne and State of Indiana, have invented new and useful Improvements in Vehicle-Heaters, of which the following is a full and accurate specification and exposition, which, when taken in connection with the accompanying drawings, forming a part thereof, will be such as to enable others skilled in the art to which the invention relates to make and use the same with absolute exactitude.

This invention has relation, more particularly, to a construction for heating the interior of vehicles or the like, although it may with slight modifications be made applicable for heating rooms or tents or the like.

The object of this invention, broadly stated, is to provide a heating plant for vehicles or the like, which will be neat and attractive in appearance, strong and durable in construction, easy of installation, easily operated and controlled, which can be manufactured and sold at a comparatively low price, and which will give a maximum of efficiency, and that with a minimum of expense for maintenance thereof.

A more particular object is to provide a heater for vehicles or the like, being especially adapted for heating rural mail delivery vehicles, the device being adapted whereby it will not take up any of the space in the interior of the vehicle, but at the same time being within reach of the occupant of the vehicle where it may be easily controlled and being so positioned that it will afford the highest degree of efficiency.

Other specific objects are: to provide means whereby the danger from the fuel and the offensiveness thereof will be practically *nil;* and to provide means for supplying the necessary amount of fresh air to the burner, but at the same time drawing the air principally from the cooler portion of the interior of the vehicle.

Other particular objects and specific advantages of the invention will be brought out in the course of the ensuing specification.

The preferred manner for the construction of our invention is shown most clearly in the accompanying two sheets of drawings, in which—

Figure 1 shows a longitudinal sectional view as taken centrally through our invention, and showing a portion of a vehicle to which it may be connected in order to more clearly illustrate the application of our invention. This application however may be different under varying conditions depending on the construction of the vehicle. Fig. 2 shows an enlarged bottom plan view of the combustion chamber and the interior thereof, the door being displaced for that purpose. Fig. 3 shows a top plan view of our invention, showing the frame of the register grates. Fig. 4 shows a top plan view looking into the interior of the combustion-chamber, the grates being removed for that purpose. Fig. 5 is a plan view of the grates for the combustion-chamber, showing same inverted. Fig. 6 is a central vertical transverse section, as taken through the combustion chamber. And Fig. 7 is a fragmentary isometrical view of the cold-air chamber showing particularly the air conduit.

Similar reference characters designate like parts throughout the several views of the drawings.

In order that our invention may be thoroughly understood and its many advantages fully appreciated we will now take up a detail description thereof and will set forth the construction and operation of the invention as briefly and as comprehensively as we may.

For the purpose of showing the application of our invention we have, in Fig. 1, shown a portion of a vehicle in section, in which the letter A denotes the floor, B the seat, C the back, D the top, E the farther side, in the rear of the door opening; F the farther side in front of the door opening; G the dash; and H the farther door opening. The front, a portion of the top, and the running-gear of the vehicle are not shown as said parts are not necessary to an understanding of this invention.

*Construction.*—The receptacle consists of a metallic rectangular box, the sides and bottom thereof being formed, preferably, of sheet metal, divided partially into two chambers which are designated for convenience as the air-chamber 1, and the combustion chamber 2, said chambers being connected at their lower portions, their upper portions being divided by a double wall forming a circulation air space 3 therebetween. The top of the receptacle thus formed, and being a part thereof, is covered by a metal floor-plate 4 secured thereto and consisting of the sides and ends forming flanges to rest on the floor A and a dividing member integral therewith which covers the top of the flue 3, the latter being a little to one side of the center, whereby the warm air grate is formed square while the cold-air grate is oblong and of slightly less surface. The numeral 5 designates the cold-air grate which is integral with the floor-plate 4, while the hot-air grate 6 is removable, being fitted into a rabbet therefor formed in the floor-plate whereby the grate 6 will rest in said rabbet with its face flush with the face of the floor-plate. The numeral 7 denotes a round-fire-deflecting grate suspended from the center of the grate 6 by the bolt 8, being held some distance below the grate 6 by the strut-block 9. The grates 6 and 7, being secured together, are adapted to be lifted out of their operative positions by means of the reverse end of the key 10, which is adapted to enter one of the apertures of the grate 6, as shown.

The inside of the upper portion of the combustion-chamber 2 is lined with comparatively heavy sheets of asbestos 11, or the like, which should also be interposed between the floor A and the flange of the floor-plate 4 as indicated. Secured horizontally in the center of the combustion chamber is a spider 12, being secured by rivets or the like to the sides of the chamber, and said asbestos lining being supported at its lower edge by said spider, the upper edge of said asbestos being retained in place by inturned lips extending down from the floor-plate; but the essential function of said spider is to carry the burner 13 and its controlling and supply mechanism. The said burner 13 may be of any preferred construction adapted to the fuel to be employed for heating, which in this instance is gasolene. Said burner is secured in the center of the spider 12, with its feed projecting below the spider, thence upward and rearwardly at an angle to the generator 14, and then having communication with the generator-pipe 15, which latter is connected to supply-pipe 16, the latter passing along under the floor A and then upwardly where it is connected with the supply-tank 17, said supply-pipe 16 being provided with a union 27 near its center. The supply of gas generated by the generator is controlled, as to its flow, by the needle-point shaft 18 which stands vertically, being threaded into the casing therefor which extends down from the burner, said casing having a branch which leads off to the generator as indicated.

An oil cup 19 is threaded on the lower end of the depending burner stem, to enable the burner to be started by burning oil in the cup in the usual manner.

On the lower end of the shaft 18 is secured the gear-wheel 20, which meshes with the similar gear-wheel 21. At one point in the periphery of the wheel 21 there is formed a double cog 21ᵃ whereby said wheels will revolve together only in the compass of one revolution. The wheel 21 is mounted on the lower end of the shaft 22, being carried by the bracket 23 which extends outward and downward from the lower end of the generator, the upper end of said shaft 22 being even with the top of the grate 6, an aperture being formed through said grate to receive the upper end of the shaft. The upper end of the shaft 22 is formed square to fit in the socket of the key 10 by which said shaft may be rotated with said key. The upper portion of the shaft 22 passes through an aperture therefor in the ear 24, which ear extends in from the inside of the floor-plate 4 as shown, by which said shaft is supported at its upper portion.

Access is obtained to the underside of the burner mechanism by reason of the bottom of the combustion chamber 2 being hinged, forming the downwardly opening door 25, said door being hinged to and adapted to be turned back against the stationary bottom of the cold air chamber 1.

Extending across through the air-chamber 1 is a conduit pipe 26 opening at each end to the outside air, and through the wall of said conduit is a horizontally arranged row of apertures designated by the letters a, b, c, and d in Fig. 7, which apertures are opened in a direction toward the combustion chamber, or they may be turned at other inclinations if found preferable. By the above it is apparent that air may be drawn from outside the vehicle through said conduit and supplied to the flame of the burner, and by the arrangement it is apparent that a draft of air is prevented from striking the flame.

*Installation and operation.*—As indicated in Fig. 1 our invention is especially adapted to be employed for heating the interior of vehicles, and for its accommodation an aperture is formed through the floor A which is of a size to allow the walls of the combustion chamber and the cold air chamber to project down therethrough below the floor, the floor-plate 4 having a flange adapted to rest on the floor around said floor aperture, to which floor it may be secured by screws or bolts as desired. The generator pipe 15 and suitable supply pipes are then connected up as shown, extending back under the floor of the vehicle and then up to the tank 17, which latter should be secured to some suitable portion of the vehicle as shown. When the entire construction is assembled as shown it is apparent that by removing the grate 6 the fire may be started in the usual manner, controlling the flow of fuel by the key 10, turning the shaft 22. After starting the fire then the grate 6 may be replaced and the heat from the burner striking the grate 7 will be broken up thereby distributing the heat equally through the grate 6, from which it will flow into the interior of the vehicle.

It is noticeable that as the flame burns in the combustion chamber the cooler air in the vehicle will be drawn through the chamber 1 and delivered below the burner in the combustion chamber, then passing upwardly it will be heated by the flame and the grates 6 and 7, after which it will be delivered inside the vehicle, thereby establishing a circulation. In connection with said circulation it is desirable that a certain amount of fresh air be drawn from outside the vehicle, this being provided for by the conduit 26, limiting the supply but providing a sufficiency.

Having now fully shown and described our invention, what we claim and desire to secure by Letters Patent of the United States, is—

1. A vehicle floor-heater, comprising a metal casing or box constructed to depend from the floor of the vehicle and having a combustion chamber, a burner-supporting spider secured to the side walls of the combustion chamber intermediate its depth, layers of heat-non-conducting material overlying the upper portions of the inner surfaces of the side-walls of the combustion chamber and supported at their lower edges on the upper side of the spider, and a grate-carrying floor-plate overlying the top of the casing and having depending flanges which overlie the inner surfaces of said heat non-conducting layers and confine them against the walls of the combustion chamber.

2. A vehicle floor-heater, comprising a metal casing or box constructed to depend from the floor of the vehicle and having a vertical partition extending downward from its top and terminating above its bottom, dividing the interior of the casing into a cold-air chamber and a combustion chamber which communicate at their bottoms, a liquid-fuel burner within the combustion chamber, means supporting the burner from the side walls of the combustion chamber, a starting oil-cup supported by and below the burner, a portion of the bottom of the casing being constructed to open to give access to said oil-cup, and a removable grate covering the top of the combustion chamber and giving access to the burner.

In testimony whereof we have hereunto signed our names to this specification in the presence of two subscribing witnesses.

JOHN A. SHUTZ.
MADISON L. KIRKMAN.

Witnesses:
R. W. RANDLE,
R. E. RANDLE.